United States Patent
Bellers et al.

(10) Patent No.: US 6,445,741 B1
(45) Date of Patent: *Sep. 3, 2002

(54) MOTION ESTIMATION

(75) Inventors: Erwin B. Bellers; Gerard De Haan, both of Eindhoven (NL)

(73) Assignee: Koninklijke Philips Electronics N.V., Eindhoven (NL)

( * ) Notice: Subject to any disclaimer, the term of this patent is extended or adjusted under 35 U.S.C. 154(b) by 0 days.

This patent is subject to a terminal disclaimer.

(21) Appl. No.: 09/843,430

(22) Filed: Apr. 26, 2001

Related U.S. Application Data

(63) Continuation of application No. 09/168,454, filed on Oct. 8, 1998, now Pat. No. 6,289,051.

(30) Foreign Application Priority Data

Oct. 15, 1997 (EP) .............................................. 97203223

(51) Int. Cl.7 ................................................. H04N 7/32
(52) U.S. Cl. ................................. 375/240.16; 348/699
(58) Field of Search ................................. 348/441, 451, 348/452, 699; 375/240.01, 240.12–240.17, 240.21, 240.24, 240.25; H04N 7/32

(56) References Cited

U.S. PATENT DOCUMENTS

| | | | | |
|---|---|---|---|---|
| 4,890,160 A | * | 12/1989 | Thomas ...................... | 348/699 |
| 4,941,044 A | * | 7/1990 | Trew ...................... | 375/240.21 |
| 4,985,767 A | * | 1/1991 | Haghiri et al. ......... | 375/240.25 |
| 5,008,746 A | * | 4/1991 | Bernard et al. ........ | 375/240.25 |
| 5,068,727 A | * | 11/1991 | Haghiri et al. ......... | 375/240.14 |
| 5,193,004 A | * | 3/1993 | Wang et al. ........... | 375/240.14 |
| 5,253,056 A | * | 10/1993 | Puri et al. ............... | 375/240.15 |
| 5,347,308 A | * | 9/1994 | Wai ....................... | 375/240.24 |
| 5,347,312 A | * | 9/1994 | Saunders et al. ........... | 348/699 |
| 5,473,383 A | * | 12/1995 | Sezan et al. ................. | 348/452 |
| 6,151,363 A | | 11/2000 | Burl et al. ............. | 375/240.17 |
| 6,289,051 B1 | * | 9/2001 | Bellers et al. ......... | 375/240.16 |

FOREIGN PATENT DOCUMENTS

| | | | | |
|---|---|---|---|---|
| EP | 0630157 | 12/1994 | ............ | H04N/7/13 |
| WO | WO9305616 | 3/1993 | ............ | H04N/7/01 |

* cited by examiner

*Primary Examiner*—Richard Lee
(74) *Attorney, Agent, or Firm*—Edward W. Goodman

(57) ABSTRACT

In a method of estimating motion vectors from subsampled video data (I), first vectors are estimated (ME, PM2) between an image with a first sub-sampling phase and an earlier image sub-sampled with a second sub-sampling phase, second vectors are estimated (ME, PM1) between an image with a second sub-sampling phase and an earlier image sub-sampled with a first subsampling phase, and the first and second vectors are combined (CD) to obtain output motion vectors (MV).

8 Claims, 1 Drawing Sheet

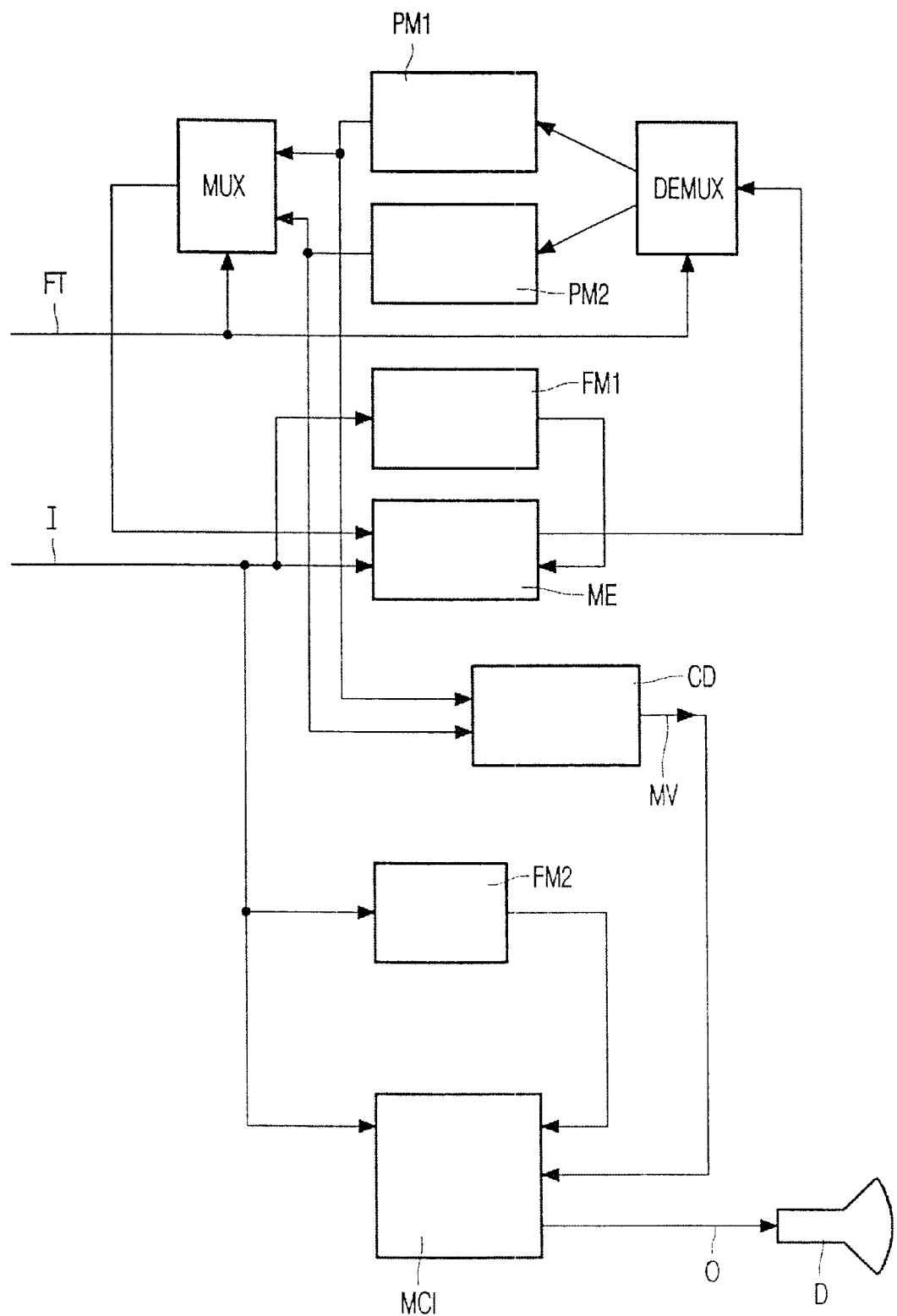

MOTION ESTIMATION

CROSS-REFERENCE TO RELATED APPLICATIONS

This is a continuation of U.S. patent application Ser. No. 09/168,454, filed Oct. 8, 1998 now U.S. Pat. No. 6,289,051.

BACKGROUND OF THE INVENTION

1. Field of the Invention

The invention relates to motion estimation on sub-sampled (interlaced) video data for, e.g., scanning format conversion.

The analysis of motion in a video sequence is embedded in many advanced video processing techniques, like advanced coding, noise reduction, and scan rate conversions, such as, de-interlacing and Frame Rate Conversion (FRC). In coding applications, motion information is used to minimize the prediction error and consequently the bit rate. Temporal noise filtering is very effective, but requires Motion Compensation (MC) if objects in the image move. De-interlacing, which is a prerequisite for high quality Motion Estimation (ME) and vertical scaling of interlaced video, requires information from multiple fields, which need therefore motion compensation. In case of scan rate conversion, motion information is needed for temporal interpolation that eliminates jerkiness of the motion portrayal and motion blur.

2. Description of the Related Art

Different applications may demand different types of motion estimators. In case of coding, motion estimation is based on minimizing the difference between image parts, and coding the resulting error. The resulting motion vectors do not necessarily reflect true motion within the video sequence. The motion estimation can be optimized to find the smallest error, resulting in the most efficient coding. For scan rate conversion applications, temporal interpolation is realized in the direction of the motion. Consequently, it is important that the motion vectors describe the true motion vectors within the video sequence. It is therefore not sufficient to demand the smallest difference between image parts in the motion estimation. The motion behavior in the environment is also an important factor.

Motion estimations designed for scan rate conversion can be used for coding purposes, but not immediately vice versa. The motion estimation described in this paper is therefore not restricted to scan rate conversion but designed to find the true-motion vectors.

Most video data is available in a so-called interlaced format, i.e., a format in which the odd scan lines in odd fields and even lines in even fields together constitute a frame that describes an image, but the odd and even fields are NOT describing the image at the same temporal instance. Motion in video data is preferably measured on the shortest available time interval, i.e., the field interval in case of interlaced data. Due to vertical detail in the picture (causing alias in the sub-sampled field-grid), however, it may be impossible to correctly find the vertical displacement between two consecutive fields. The alias pattern and the original detail may move differently.

Consider a stationary horizontal white line of two scanning lines width available in an interlaced video format. Odd and even fields will both show a single white line. Considering the information in two successive fields, it is ambiguous whether we deal with a one scanning line wide white line moving with a vertical velocity of 1 sample/field-period, or a stationary horizontal white line of two scanning lines width.

A common way to deal with the mentioned problem, is to first up-convert at least one of the two fields into a progressive format, and perform the motion estimation between two frames or between a frame and a field [see Ref. 2]. An alternative exists in estimating the motion applying data from three successive fields [see Ref. 3]. Finally, it is possible to hope that the low-frequency content of the image is dominant, correct the phase for those frequencies, and estimate motion more or less neglecting the problem [see Ref. 1].

A characteristic that Ref. 2 and Ref. 3 share, is that they double the access to the previous image data (from just the previous field, to the previously de-interlaced field, or the previous and the pre-previous field, respectively). Also the solution proposed in Ref. 3 introduces a new constraint in the motion estimator, in that the motion over a two-field-period has to be assumed constant. The option of Ref. 1 does not double the memory access (and capacity!) and introduces no constant motion constraints, but cannot solve the ambiguity either, as experiments on critical picture material show.

SUMMARY OF THE INVENTION

It is, inter alia, an object of the invention to reduce ambiguity in the motion estimation in a simple manner. To this end, a first aspect of the invention provides a method and a device for estimating motion vectors from sub-sampled video data. A second aspect of the invention provides an image signal display apparatus comprising such a motion vector estimating device, a motion compensated interpolator and a display device.

In a method of estimating motion vectors from sub-sampled video data in accordance with a primary aspect of the invention, first vectors are estimated between an image with a first sub-sampling phase and an earlier image sub-sampled with a second sub-sampling phase, second vectors are estimated between an image with a second sub-sampling phase and an earlier image sub-sampled with a first sub-sampling phase, and the first and second vectors are combined to obtain output motion vectors.

These and other aspects of the invention will be apparent from and elucidated with reference to the embodiments described hereinafter.

BRIEF DESCRIPTION OF THE DRAWING

The drawing shows a sole FIGURE illustrating an embodiment of the invention.

DESCRIPTION OF THE PREFERRED EMBODIMENTS

As mentioned above, two successive fields cannot discriminate between stationariness and a vertical velocity of 1 sample/field for a line with a width of 2 pixels. Consequently, two successive fields do not contain enough information to solve the ambiguity problem.

Block matching, as a possible basis for motion estimation, tries to find the best correlation between two image parts in the subsequent fields. As a consequence, it is very likely that the motion estimation detects the above mentioned ambiguity problem as an object with a vertical velocity of 1 sample/field. If the true velocity is 1 sample/field, it will continuously make the correct decision, but if the line is just stationary, the decision will toggle between a positive and negative velocity of 1 sample/field. The motion estimation that uses previous results as a first estimate of motion in the next time instance disturbs the convergence process in this situation.

The new motion estimation exploits this principle, by making use of two separate prediction memories. The 'even'-prediction memory PM2 is used if the current field is even and the 'odd'-prediction memory PM1 is used if the current field is odd. Consequently, each prediction memory is updated with half the temporal frequency. Both prediction memories PM1, PM2 can converge to a stable situation, that does not necessarily reflect the true motion. However, combining the results stored in both prediction memories may provide a better clue concerning the true-motion. FIG. 1 illustrates the new algorithm, called the Twin motion estimation.

An input field I is applied to a first input of a motion estimator ME, and to a field memory FM1 for furnishing a delayed field to another input of the motion estimator ME. An output of the motion estimator ME is applied to a demultiplexer DEMUX, whose outputs are connected to inputs of an odd prediction memory PM1 and an even prediction memory PM2. Outputs of the prediction memories PM1, PM2 are applied to a multiplexer MUX whose output is applied to the motion estimator ME. Outputs of the prediction memories PM1, PM2 are also applied to a combination device CD which furnishes output motion vectors MV. A field type indication signal FT is applied to the multiplexer MUX and the demultiplexer DEMUX.

The input field I is also applied to a motion-compensated interpolator MCI, and a second field memory FM2 for furnishing a delayed field to another input of the motion-compensated interpolator MCI. The output motion vectors MV from the combination device CD are also applied to the motion-compensated interpolator MCI, whose output O is, for example, a signal having a doubled field frequency or, a signal without interlace which is displayed on the display device D. Preferably, the same field memory device is used for both FM1 and FM2.

The odd motion vector estimation is defined by:

$$d^o(\vec{x},n) = ME(f_e(\vec{x}, n-1), f_o(\vec{x},n)) \quad (1)$$

with $f_e$ and $f_o$ representing the even and odd input fields, respectively, and the even motion vector estimate as:

$$d^e(x,n) = ME(f_o(\vec{x}, n-1), f_e(\vec{x},n)) \quad (2)$$

with $ME(f_1, f_2)$ indicating motion estimation between image $f_1$ and $f_2$. As a consequence of the two prediction memories, the twin motion estimation uses two candidate sets ($CS_o$ and $CS_e$). So, $d^o(\vec{x},n)$ is also defined by:

$$d^o(\vec{x}, n) = \begin{cases} d^o(\vec{x}, n-1) & n \bmod 2 = 0 \\ \{\vec{C} \in CS_o | \zeta(f_o(\vec{x}, n), f_e(\vec{x}, n-1), \vec{C}, \vec{x}, n) \leq \\ \zeta(f_o(\vec{x}, n), f_e(\vec{x}, n-1), \vec{V}, \vec{x}, n)\} \forall \{\vec{V} \in CS_o\} & \text{otherwise} \end{cases} \quad (3)$$

with $d(\vec{x},n)$ the motion vector $(d_x, d_y)^t$ at position $(x, y)$ for field n, $\vec{C}$ a motion vector candidate, selected from a certain set of motion vectors or candidate set (CS), and $\zeta()$ the error function. A similar expression can be written for $d^e(\vec{x},n)$.

The combination device CD, indicated in FIG. 1, generates the output motion vector $d(\vec{x},n)$ according to:

$$d(\vec{x},n) = \psi(d^o(\vec{x},n), d^e(\vec{x},n)) \quad (4)$$

In the text below, $d^o(\vec{x},n)$ and $d^e(\vec{x},n)$ will be abbreviated as $d^o$ and $d^e$, respectively.

It seems reasonable just to average $d^o$ and $d^e$, since the above mentioned problem will, in case of stationariness, result in opposite vertical motion vectors. So, $\psi()$ could be defined by:

$$\psi_y 1(d^o, d^e) = \frac{d^{o_y} + d^{e_y}}{2} \quad (5)$$

$$\psi_x 1(d^o, de^e) = \frac{d^{o_x} + d^{e_x}}{2}$$

However, since every estimate is constructed out of different field pairs and images generally contain noise, the sign might be different, but the absolute magnitude of the vertical component is not necessarily equal. Consequently, a straight forward average is generally not sufficient to solve the ambiguity problem. Better results are expected with a non-linear function for $\psi()$. The horizontal direction does not suffer from the ambiguity problem, therefore, averaging for the horizontal direction is a reasonable solution. In the text below, it is assumed that $\psi()$ obeys the definition in equation 5, unless otherwise noted.

Many non-linear functions can be thought of. Since toggling of the signs of the vertical motion component is very unrealistic in natural sequences, a possible non-linear function for $\psi()$ is defined by:

$$\psi_y 2(d^o, d^e) = \begin{cases} 2m(((d_y^o - 2m)(d_y^e - 2m)) < 0), & m \in Z \\ \frac{d_y^o + d_y^e}{2}, & \text{otherwise} \end{cases} \quad (6)$$

The ambiguity problem not only holds for the distinction between zero vertical motion and a motion of 1 pixel/field, but for all even velocities $2m$ with $m \in Z$.

The argument for a non-vertical motion component can even be set stronger:

$$\psi_y 3(d^o, d^e) = \begin{cases} 2m(((d_y^o - 2m)(d_y^e - 2m)) < 0), & m \in Z \\ \frac{d_y^o + d_y^e}{2}, & \text{otherwise} \end{cases} \quad (7)$$

Although the ambiguity problem occurs in the vertical direction only, the horizontal component might converge to an undesired situation, caused by the inherent bias of the algorithm in the vertical direction. Consequently, constraints as mentioned in the expressions above can be extended into the horizontal direction also:

$$\psi_x 4(d^o, d^e) = \begin{cases} 2m(((d_x^o - 2m)(d_x^e - 2m)) < 0), & m \in Z \\ \frac{d_x^o + d_x^e}{2}, & \text{otherwise} \end{cases} \quad (8)$$

Note that $\psi()$ does not influence the content of the prediction memories, since $d(\vec{x},n)$ is not stored, allowing both prediction memories to converge individually. A possible drawback of the twin motion estimation is the lower update rate of the prediction memory compared to a one prediction memory architecture, that might result in a slower convergence. On the other hand, eliminating the ambiguity in both prediction memories might result in an even faster convergence of the individual prediction memories.

Experiments, in which resulting motion vectors were used for de-interlacing purposes, indicate indeed that a good quality motion vector results. The table below lists average MSEs (Mean Square Errors) calculated over a sequence of 30 fields of various image sequences, using the proposed combined motion vectors against the methods proposed in Refs. 1 and 2. It can be seen that it offers a quality level close to that of the best methods, at a price (memory capacity and bandwidth) more comparable to that of the simplest method.

| test sequence | MSE conform [1] | MSE conform [2] | MSE invention |
|---|---|---|---|
| circle | 94 | 18 | 16 |
| circlenoise | 199 | 93 | 91 |
| calen | 267 | 136 | 152 |
| shopping | 78 | 46 | 47 |
| mobcal | 182 | 86 | 87 |
| renata | 148 | 68 | 68 |

A primary aspect of the invention can be summarized as follows. It is an object of this primary aspect of the current invention to reduce ambiguity in the motion estimation, without increasing the access to, and the capacity of, the memory, and without introducing constant motion constraints in the estimator. To this end, we first recognize that when estimating motion with an even vector y-component between a previous odd field and a current even field, the estimated motion vector may be wrong in vertical direction (y-component error), and the direction of the error is opposite (for the same object position relative to the interlaced sampling grid) when estimating motion with an even vector y-component between a previous even field and a current odd field. For an even vertical velocity, the object position (relative to the interlaced sampling grid) is identical in all fields, and combination of a first estimate resulting from a first field pair and a second resulting from the previous (or next) field pair may provide a better clue concerning the real velocity of the object.

Having these recognitions in mind, the following method to estimate motion vectors from interlaced video data is disclosed. The invention reduces the ambiguity of the vertical component of the estimated motion vector due to the sub-sampling, by combining motion estimates from two consecutive field pairs. This solution reduces the memory bandwidth (factor of two) for the estimator, compared to the alternatives known from the literature, and does not introduce constant motion constraints as some of the mentioned alternatives do.

The following salient features of the invention are noteworthy. A method, and apparatus realizing this method, for estimating motion vectors from subsampled video data, characterized in that it comprises a combination device, combining:

first vectors estimated between an image with a first sub-sampling phase and an earlier image sub-sampled with a second sub-sampling phase, with second vectors estimated between an image with a second sub-sampling phase and an earlier image sub-sampled with a first sub-sampling phase.

Preferably, the sub-sampled video data is so-called interlaced video data, and said image with a first sub-sampling phase is an odd field, and said image sub-sampled with a second sub-sampling phase is an even field.

Preferably, the output of the combination device is used as the output vector of the estimator.

Advantageously, the combination exists in setting the output vector y-component to zero in case the sign of the y-component of said first and said second vectors differs.

Advantageously, the combination exists in setting the output vector y-component to an even value in case the values of the y-components of said first and said second vectors lie close to, but on either side of, said even value.

Preferably, the 3D Recursive Search Block Matcher of Ref. 4 is used, and first vectors are written in a first prediction memory and the second vectors in a second prediction memory, whereby a first sub-sampling phase uses the first prediction memory only, and the second sub-sampling phase uses the second prediction memory only.

Preferably, the vectors estimated on earlier video data are stored in a reduced form (sub-sampled prediction memory, or other data compression format).

It should be noted that the above-mentioned embodiments illustrate rather than limit the invention, and that those skilled in the art will be able to design many alternative embodiments without departing from the scope of the appended claims. The word "comprising" does not exclude the presence of other elements or steps than those listed in a claim. The invention can be implemented by means of hardware comprising several distinct elements, and by means of a suitably programmed computer. In the device claim enumerating several means, several of these means can be embodied by one and the same item of hardware.

REFERENCES

[1] M. Burl and P. Layton "Video Image Processing", International Application WO 93/05616, corresponding to U.S. Pat. No. 6,151,363.

[2] F. M. Wang, D. Anastassiou, and A. N. Netravali, "Time-Recursive De-interlacing for IDTV and Pyramid Coding", in Signal processing: Image Communications 2, Elsevier, 1990, pp. 365–374.

[3] L. Vanderdorpe, L. Cuvelier, B. Maison, P. Quelez, and P. Delogne, "Motion-compensated conversion from interlaced to progressive formats", in Signal Processing: Image Communication 6. 1994, pp. 193–211, Elsevier.

[4] G. de Haan, P. W. A. C. Biezen, H. Huijgen and O. A. Ojo, "True-Motion Estimation with 3-D Recursive Search Block Matching", IEEE transactions on Circuits and Systems for Videotechnology, Vol. 3, No. 5, October 1993, pp. 368–379.

[5] J. L. Yen, "On Non uniform Sampling of Bandwidth Limited Signals", IRE Tr. on Circuit Theory, vol. CT-3, pp. 251–257, December 1956.

[6] E. B. Bellers and G. de Haan, "Advanced motion estimation and motion compensated de-interlacing", Proc. of the Int. Workshop on HDTV'96, October 1996, Los Angeles, USA.

[7] E. B. Bellers and G. de Haan, "Advanced de-interlacing techniques", Proc. of the ProRlSC/IEEE Workshop on Circuits, Systems and Signal Processing, Mierlo, the Netherlands, Nov. 27–28, 1996, pp. 7–17.

What is claimed is:

1. A method of estimating motion vectors from sub-sampled video data, the method comprising the steps:

recursively estimating, by means of a motion estimator and a first vector prediction memory, first vectors between a first current image with a first sub-sampling phase and an earlier image sub-sampled with a second sub-sampling phase;

recursively estimating, by means of said motion estimator and a second vector prediction memory, second vectors between a second current image with the second sub-sampling phase and said first current image sub-sampled with the first sub-sampling phase; and combining said first and second vectors.

2. The method as claimed in claim 1, wherein said sub-sampled video data is interlaced video data, said image with the first sub-sampling phase is an odd field, and said image sub-sampled with the second sub-sampling phase is an even field.

3. A device for estimating motion vectors from sub-sampled video data, the device comprising:

a first vector prediction memory and a second vector prediction memory separate from said first vector prediction memory;

means for recursively estimating, using said first vector prediction memory, first vectors between a first current image with a first sub-sampling phase and an earlier image sub-sampled with a second sub-sampling phase, and for estimating, using said second vector prediction memory, second vectors between a second current image with the second sub-sampling phase and said first current image sub-sampled with the first sub-sampling phase; and means for combining said first and second vectors.

4. An image signal display apparatus, comprising:

the motion vector estimating device as claimed in claim 3 for furnishing motion vectors;

a motion compensated interpolator for generating an output image signal; and a display device for displaying the output image signal.

5. A device for estimating motion vectors from sub-sampled video data, the device comprising:

means for estimating first vectors between an image with a first sub-sampling phase and an earlier image sub-sampled with a second sub-sampling phase;

means for estimating second vectors between an image with the second sub-sampling phase and an earlier image sub-sampled with the first sub-sampling phase; and means for combining said first and second vectors, wherein said combining means sets an output vector y-component to zero in case the signs of respective y-components of said first and said second vectors differ.

6. A device for estimating motion vectors from sub-sampled video data, the device comprising:

means for estimating first vectors between an image with a first sub-sampling phase and an earlier image sub-sampled with a second sub-sampling phase;

means for estimating second vectors between an image with the second sub-sampling phase and an earlier image sub-sampled with the first sub-sampling phase; and means for combining said first and second vectors, wherein said combining means sets an output vector y-component to an even value in case values of respective y-components of said first and said second vectors lie close to, but on mutually different sides of said even value.

7. An image signal display apparatus comprising:

the device for estimating motion vectors as claimed in claim 5 for furnishing motion vectors;

a motion compensated interpolator for generating an output image signal; and a display device for displaying the output image signal.

8. An image signal display apparatus comprising:

the device for estimating motion vectors as claimed in claim 6 for furnishing motion vectors;

a motion compensated interpolator for generating an output image signal; and a display device for displaying the output image signal.

* * * * *